G. W. PENNISTON.
Loading Railroad Flat Cars.
No. 138,577. Patented May 6, 1873.
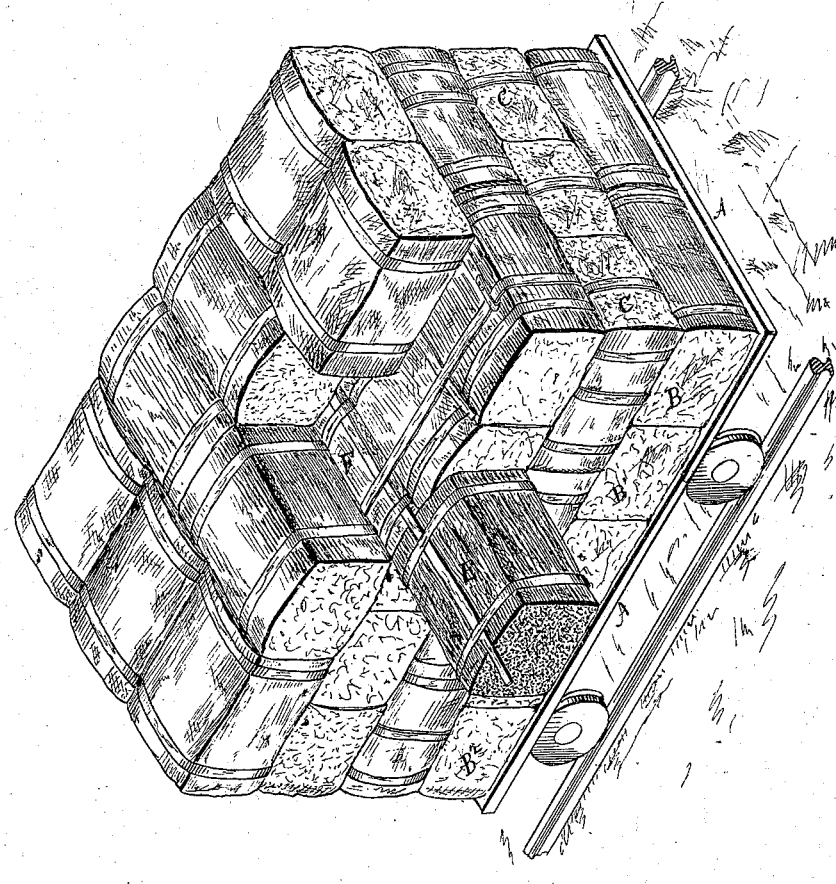
Witnesses.
Fred. W. Bohnew
Alexander Shepherd
Inventor.
George W. Penniston
AM. PHOTO-LITHOGRAPHIC CO. N.Y.(OSBORNE'S PROCESS.)

UNITED STATES PATENT OFFICE.

GEORGE W. PENNISTON, OF NORTH VERNON, INDIANA.

IMPROVEMENT IN LOADING RAILROAD FLAT CARS.

Specification forming part of Letters Patent No. 138,577, dated May 6, 1873; application filed September 5, 1872.

*To all whom it may concern:*

Be it known that I, GEORGE W. PENNISTON, of North Vernon, Jennings county and State of Indiana, have invented certain Improvements in Securing Bundles or Bales of Hay, Straw, Cotton, Flax, Hemp, or other Materials on Platform-Cars of Railroads, of which the following is a specification:

This invention relates to the fastening and securing bales of hay and other products to platform-cars on railroads, and the bales to each other on the car, for transportation from place to place, without the risk of their falling off, and without the use of stakes or ropes.

In the accompanying drawing, a platform-car is shown loaded with bales of hay fastened and secured in accordance with my invention.

In this drawing, A is the platform of the car, and B a corner bale of the load. To fasten this bale to the platform of the car I slip a piece of refuse hoop under one or more of the sticks that run lengthwise of the bale B on its lower side, and nail the end of the hoop to the car, and slip the bale over the nailing, and nail the hoop again near the edge of the bale, and put the projecting end of the hoop under one or more of the pieces of wood which lie lengthwise of the bale $B^1$, and slip the bale up by the side of the bale B, and nail the hoop to the platform close by the side of the bale $B^1$, and continue to fasten each bale in the tier in the same way until the end bale $B^2$ is put on, when I turn the end of the hoop up over the top of the bale, and nail or otherwise fasten the end of the hoop to the hoops of the bale, or one or more of the pieces of wood that run lengthwise of the bale. When this is done I fasten another tier of bales by the side of the first in the same way, and then slip the binding or fastening hoops for the next tier on top, alternately under the hoops or pieces of wood on the top of the lower tier, and on the under side of the tier of bales next above, and at the ends turn the hoops up over, as shown at C C, and fasten them, as before mentioned.

By fastening each tier of bales to those next below, as above described, the car may be loaded with as many tiers of bales as may be desired.

The bales may be laid alternately in each direction, as shown, in three lower tiers on the car; and the tiers may be fastened together widthwise of the car by some pieces of hoop put crosswise, and bent over and nailed, as shown at D, or fastened by putting a hoop under the hoops of the bales E and F, and then turning E over onto the top of F.

What I claim as my invention and improvement is—

The mode of fastening or securing bales of hay or other materials to cars by means of flexible hoops secured to the car and passing around the bale, substantially as described.

GEORGE W. PENNISTON.

Attest:
FRED. W. BOHNEN,
ALEXANDER SHEPHERD.